United States Patent [19]
Wood et al.

[11] Patent Number: 5,443,667
[45] Date of Patent: Aug. 22, 1995

[54] DEVICE AND METHOD FOR SPLICING TIRE TREAD STRIP EDGES USING TRAVERSING ULTRASONIC TRANSDUCERS

[75] Inventors: Ira L. Wood, Akron; Wayne A. Wurzbacher, Stow, both of Ohio

[73] Assignee: Bridgestone/Firestone, Inc., Akron, Ohio

[21] Appl. No.: 255,293

[22] Filed: Jun. 7, 1994

Related U.S. Application Data

[63] Continuation of Ser. No. 850,187, Mar. 11, 1992, abandoned.

[51] Int. Cl.[6] .............................................. B32B 31/16
[52] U.S. Cl. ................................. 156/73.4; 156/157; 156/304.5; 156/406.4; 156/409; 156/502; 156/580.1
[58] Field of Search ...................... 156/73.1, 73.4, 130, 156/134, 130.3, 157, 304.1, 304.5, 405.1, 406.4, 408, 409, 410, 443, 502, 507, 580.1, 580.2, 218

[56] References Cited

U.S. PATENT DOCUMENTS

| | | |
|---|---|---|
| 3,556,912 | 1/1971 | Burgo et al. ............... 156/580 |
| 3,602,421 | 8/1971 | Spratt ....................... 156/73.1 |
| 3,886,012 | 5/1975 | Slater ....................... 156/73.1 |
| 3,904,457 | 9/1975 | Laughlin .................... 156/73.4 |
| 4,750,970 | 6/1988 | Malosh ...................... 156/73.4 |
| 4,838,964 | 6/1989 | Thomsen .................... 156/73.1 |
| 4,904,319 | 2/1990 | Divincenzo et al. ......... 156/73.4 |
| 4,954,205 | 9/1990 | Agawa ....................... 156/502 |
| 4,961,808 | 10/1990 | Candore .................... 156/522 |
| 4,961,813 | 10/1990 | Bailey ...................... 156/406.4 |
| 5,085,719 | 2/1992 | Eck .......................... 156/73.4 |

FOREIGN PATENT DOCUMENTS 3929770 3/1990 Germany ................... 156/73.1

OTHER PUBLICATIONS

Branson 800 Series—Ultrasonic Plastics Assembly Systems, Dec. 1978.

Primary Examiner—David A. Simmons
Assistant Examiner—J. Sells
Attorney, Agent, or Firm—Carmen Santa Maria

[57] ABSTRACT

A device (10) for splicing materials such as a strip of uncured tire tread stock (11) by ultrasonic joining includes two engagement cylinders (52, 72) driving two ultrasonic transducers (40, 60) having horns (43, 63) into selective, pressure engagement with the tire tread stock (11) at the top edge (15) of the splice joint, sealing the same. A screw (81) having right-handed threads (84) and opposite, left-handed threads (85) moves horns (43, 63) from their initial point of contact at opposite tire tread edges toward centerline (16) of tire tread stock (11) while horns (43, 63) deliver ultrasonic energy to top edge (15). As transducers (40, 60) near centerline (16), transducer (40) is withdrawn and transducer (60) continues thereacross, insuring a complete seal across the entire splice joint. A quality seal is obtained by selection of transducer (40, 60) frequency, control of transducer (40, 60) amplitude, and control of the pressure and speed of the transverse motion of horns (43, 63).

11 Claims, 5 Drawing Sheets

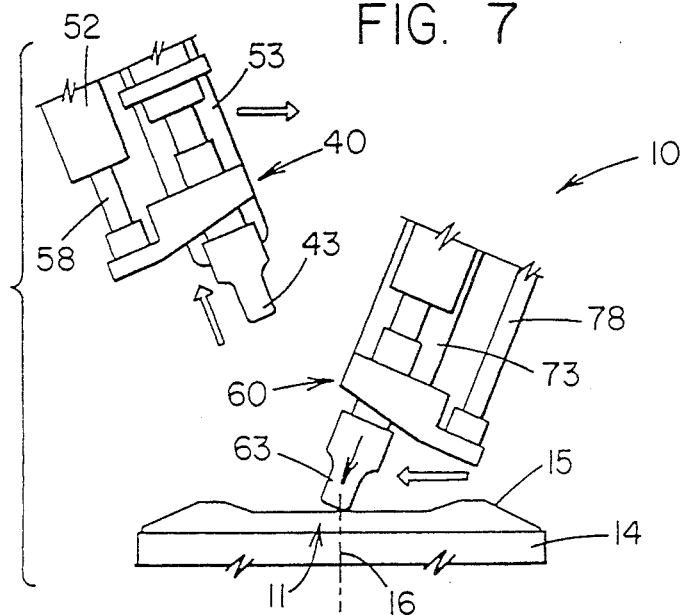
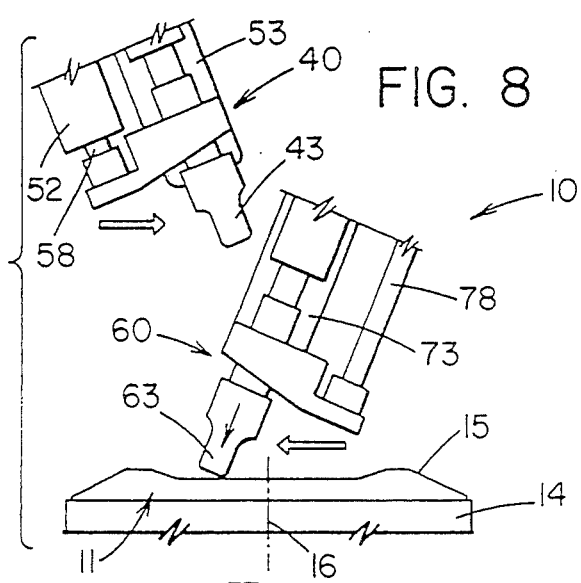
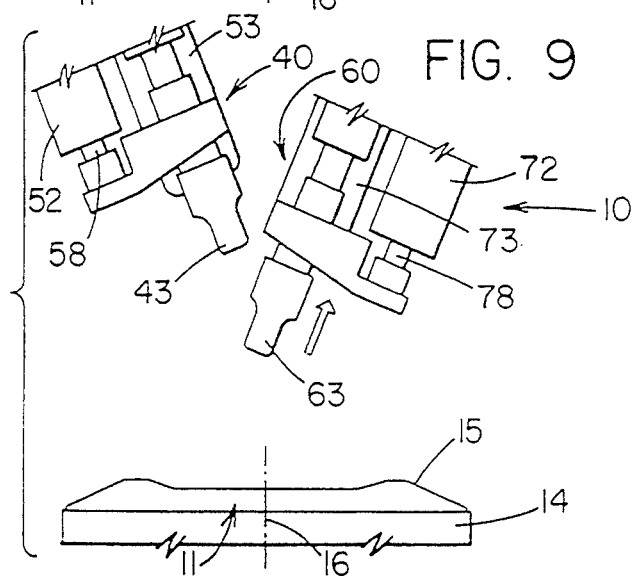

DEVICE AND METHOD FOR SPLICING TIRE TREAD STRIP EDGES USING TRAVERSING ULTRASONIC TRANSDUCERS

This is a continuation of application Ser. No. 07/850,187 filed on Mar. 11, 1992, abandoned.

TECHNICAL FIELD

The present invention relates generally to the manufacture of pneumatic tires. More particularly, the present invention relates to pneumatic tire manufacturing devices and methods employing ultrasonic transducers for sealing the edges of a tire tread strip splice such that the splice remains secured during subsequent manufacturing operation.

BACKGROUND ART

Pneumatic tires are commonly assembled on cylindrical drums onto which successive belt-shaped strips of various uncured rubber materials such as tire tread stock are placed (sometimes called spliced) and must be securely joined (sometimes called stitched, consolidated or sealed) without curing, a process that overall may be called splicing. The assembled tire may go through additional manufacturing processes, at a minimum including placement into and vulcanization within an appropriate curing press. Thus, it is imperative that the strips be spliced sufficiently securely to insure their continued coupling throughout the remaining manufacturing process without curing the same.

Various methods have been utilized to accomplish splicing of such strips. For example, in U.S. Pat. No. 4,954,205 to Agawa, the ends of a belt of reinforcing ply including a plurality of reinforcing cords are mechanically forced into butt-splice engagement by a single rotatable wheel carried on an assembly that lowers the wheel into contact with the belt ends, moves it laterally thereacross, and raises the wheel. However, such a purely mechanical engagement likely does not produce a secure seal for various materials such as tire tread stock and is subject to separation during further manufacture.

Ultrasonics has been utilized to splice the ends of strips of various tire stock. In U.S. Pat. No. 3,904,457 to Laughlin multiple ultrasonic transducers which together span the width of a strip of reinforcing ply are placed into stationary engagement with the splice in the strip for a sufficient period to sonically weld the top seam of the splice. While this produces a secure seal, it requires a large number of moderately expensive ultrasonic transducers and may necessitate additional setup each time the width of the reinforcing ply is changed.

In U.S. Pat. No. 4,904,319 to DiVincenzo et al. a single ultrasonic transducer the width of a tread stock and having an engagement horn conforming to the profile of the tread stock is placed into stationary engagement with the splice in the tread stock for a sufficient period to sonically weld the top seam of the splice. This method also produces a secure seal and overcomes the expense of a great number of ultrasonic transducers. However, it requires manufacture of a unique and expensive horn for each tread stock profile. Also, manufacturing downtime and labor costs are incurred because the horn must be replaced with each change in tread profile.

A single ultrasonic transducer has been utilized to splice the ends of a strip of photographic film in U.S. Pat. No. 3,556,912 to Burgo et al. by lowering the transducer into engagement with the film splice, moving it laterally across the film along the splice, and raising it off the film. However, the unique characteristics of photographic film necessitated the inclusion of a set of pinch wheels having independent and relatively great freedom of motion to insure the film splice is fully sealed and is not skewed or damaged during operation of the transducer.

SUMMARY OF THE INVENTION

It is, therefore, an object of the present invention to provide a device and method including a plurality of ultrasonically transducers for sealing the ends of a strip of a tire tread stock such that the splice remains secured during subsequent manufacturing operation.

It is another object of the present invention to provide a device and method, as set forth above, in which the processing time for sealing a splice and the investment in ultrasonic transducers are optimized.

It is still another object of the present invention to provide a device and method, as set forth above, in which a single set of ultrasonic transducers may be utilized for tread stock having a variety of widths and contours.

It is yet another object of the present invention to provide a device and method, as set forth above, in which setup changes for operation with tread stock of different widths and contours are minimized or eliminated.

It is a further object of the present invention to provide a device and method, as set forth above, without the need for pinch rollers.

These and other objects and advantages of the present invention over existing prior art forms will become more apparent and fully understood from the following description in conjunction with the accompanying drawings.

In general, a device for splicing a strip of tire tread stock having two mating ends includes a first ultrasonic transducer for engaging the tire tread ends and sealing a first portion of the tire tread ends, and a second ultrasonic transducer for engaging the tire tread ends and sealing a second portion of the tire tread ends partially overlapping the first portion of the tire tread ends. A method for splicing a strip of tire tread stock having two mating ends includes the steps of engaging a first ultrasonic transducer and a second ultrasonic transducer with the tire tread ends, sealing a first portion of the mated ends of the tire tread stock with the first ultrasonic transducer, and sealing a second portion of the mated ends of the tire tread stock overlapping the first portion with the second ultrasonic transducer.

BRIEF DESCRIPTION OF THE DRAWINGS

FIGS. 4 through 9 are a series of simplified front elevational views presented by the exemplary device shown in FIG. 1 as it moves through an exemplary operational sequence. FIG. 4 presents the two ultrasonic transducer assemblies in positions withdrawn from engagement with the tread stock. In FIG. 5 the transducer assemblies are shown with their horns first engaging the tread stock. FIG. 6 shows the transducer assemblies with their horns transversing the splice in the tread stock toward the centerline thereof. In FIG. 7 the left transducer assembly has concluded its transverse travel, withdrawn from engagement with the tread stock splice and is moving and out of the path of the right transducer assembly as the latter reaches the centerline of the tread stock splice.

FIG. 8 illustrates the continued transverse motion of the right ultrasonic transducer across the centerline as the left ultrasonic transducer remains out of its path. In FIG. 9 the right ultrasonic transducer is shown withdrawing from engagement with the tread stock splice after having completed its transverse motion to a point overlapping the right-most transverse position of the left ultrasonic transducer prior to disengagement. Thereafter the ultrasonic transducers return to the positions shown in FIG. 4.

PREFERRED EMBODIMENT FOR CARRYING OUT THE INVENTION

Figure 1:
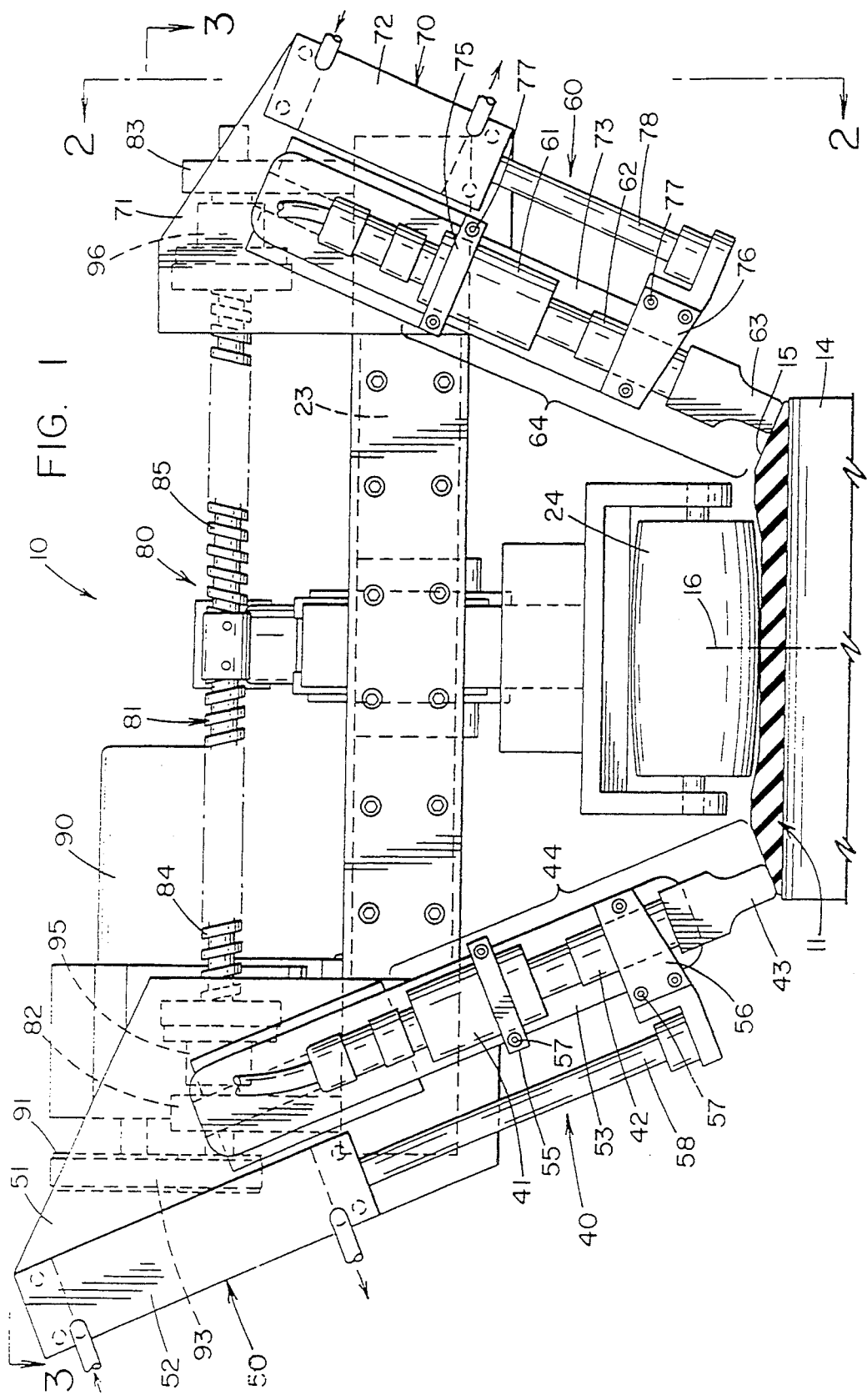
FIG. 1 is a front elevational view of an exemplary device in accordance with the present invention having two ultrasonic transducer assemblies and showing the tread stock and drum in fragmentary section.
Figure 2:
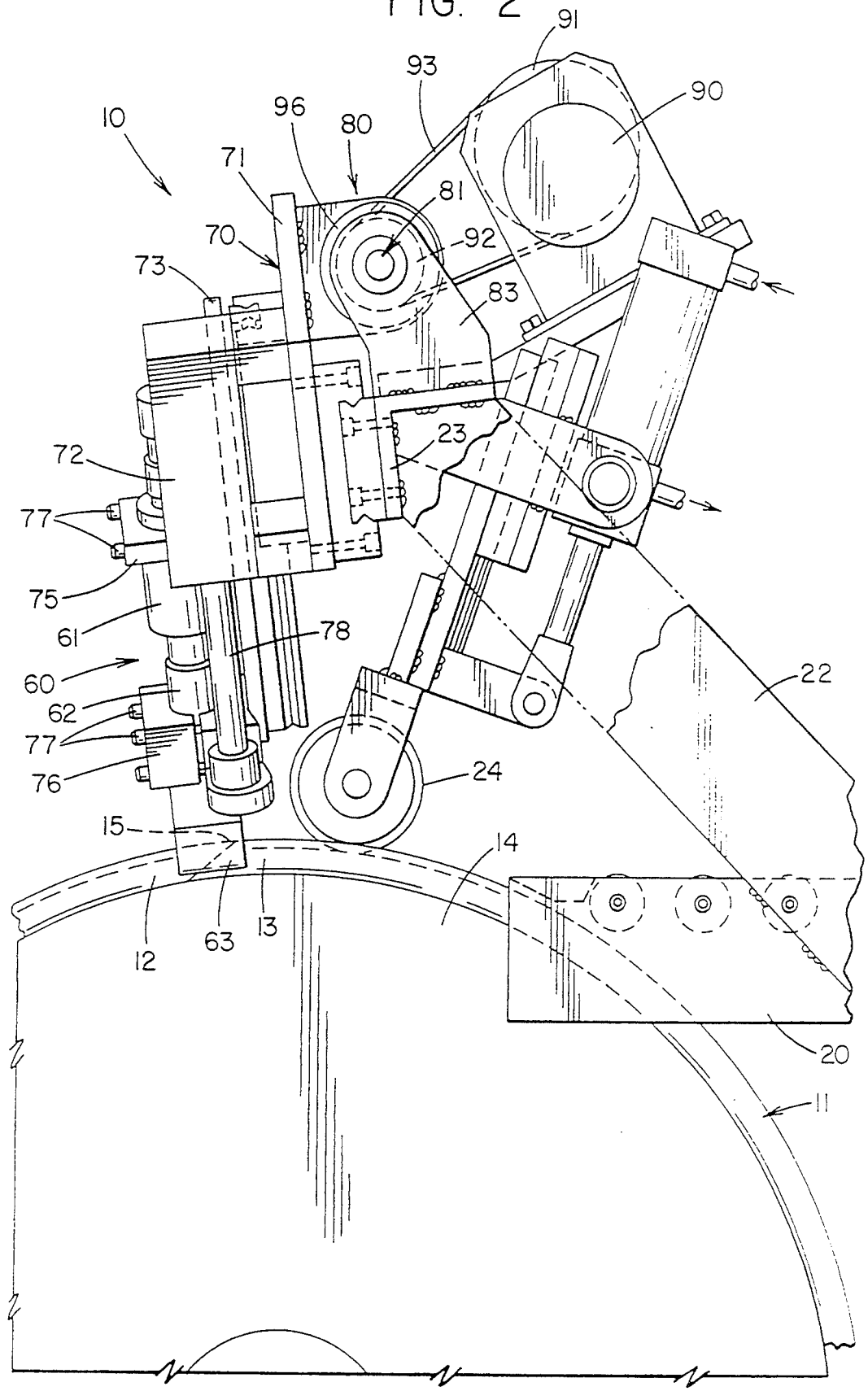
FIG. 2 is a right side elevational view of the exemplary device shown in FIG. 1.
Figure 3:
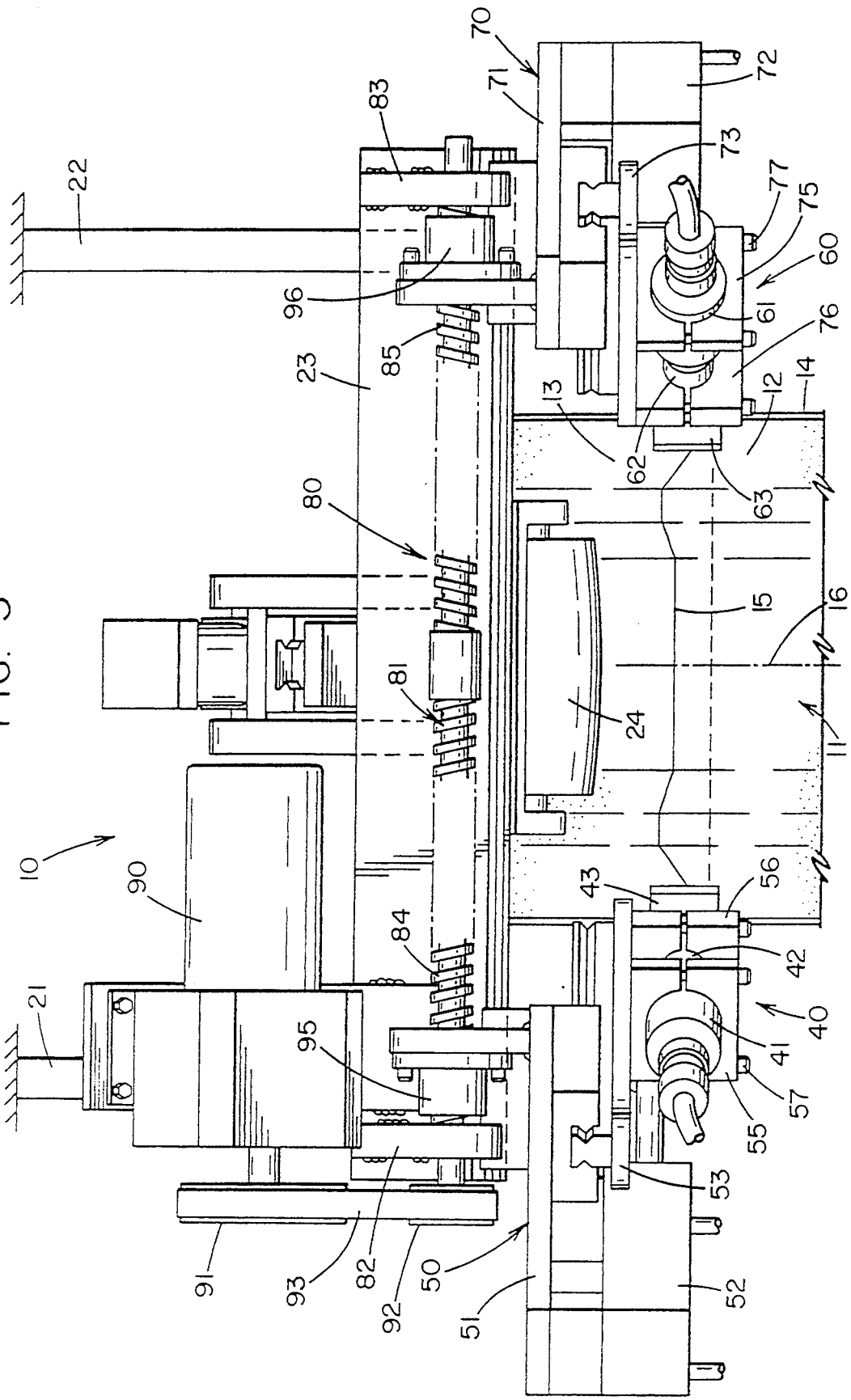
FIG. 3 is a top view of the exemplary device shown in FIG. 1.

FIG. 1 presents a front elevational view of an exemplary device in accordance with the present invention, generally indicated by the numeral 10, for splicing materials such as a strip of uncured tire tread stock 11 by ultrasonic joining. As best seen in FIGS. 2 and 3, right side elevational and top views of device 10, respectively, tire tread strip 11 is formed of two mating ends 12, 13 wrapped around a cylindrical tire building drum 14 and having a centerline 16. As is known in the pneumatic tire arts, mating ends 12, 13 may be beveled edges tapered at an angle with respect to the outer surfaces of the tire tread strip 11. Mating ends 12, 13 are brought together and placed in overlapping contiguous relationship, forming a splice joint extending diagonally across the width of tire tread strip 11. Device 10 does not seal along the entire depth of the splice joint; rather, device 10 seals the edge of tire tread strip 11 engaged therewith, shown as top edge 15 in the drawings, in the manner explained hereinbelow, sufficient to prevent separation of the splice joint.

As best seen in FIGS. 2 and 3, a conveyor 20 or other suitable means may be used to conveniently deliver selected component materials of the pneumatic tire being constructed including tire tread strip 11 to tire building drum 14. Arms 21, 22 attached to conveyor 20 by means not relevant hereto support a right angle bracket 23 for carrying both device 10 as further described below, and an applicator roller 24 for selectively engaging tire tread strip 11 and other component materials upon tire building drum 14 along centerline 16 of the same. Feed conveyors and applicator rollers are known in the tire building arts and require no further explanation.

Referring again principally to FIG. 1, device 10 may be seen to broadly include first ultrasonic transducer assembly 40 (hereinafter called transducer 40), first stack slide assembly 50 (hereinafter called stack slide 50), second ultrasonic transducer assembly 60 (hereinafter called transducer 60), second stack slide assembly 70 (hereinafter called stack slide 70), and transverse transport carriage assembly 80 (hereinafter called transverse carriage 80). Transducers 40, 60, respectively include converters 41, 61 for receiving electrical power from a control circuit (not shown) and generating an ultrasonic signal whose frequency and amplitude is adjustably selectable by the control circuit in a manner not relevant hereto, boosters 42, 62 for receiving the ultrasonic signals from converters 41, 61 and amplifying the same, and horns 43, 63 for coupling the ultrasonic signal to the material to be sealed. Converters 41, 61, boosters 42, 62 and horns 43, 63 are commonly known collectively as stacks 44, 64, respectively. Branson Ultrasonics Corporation of Danbury, Conn. manufacturers a transducer converter designated as Model 4TR and a corresponding booster having a 1:1 amplification ratio that have been found acceptable for such use.

Transducers 40, 60 effect a seal of top edge 15 with a combination of a time-limited application of ultrasonic energy through and pressure by horns 43, 63. Thus, a quality seal of top edge 15 may be obtained by selection of the operating frequency and control of the amplitude of transducers 40, 60, and control of the pressure applied by horns 43, 63 to top edge 15 and the speed with which horns 43, 63 move transversely across tire tread strip 11.

Transducers 40, 60 are preferably selected, configured, oriented and operated to maximize transfer of ultrasonic energy to top edge 15 to be sealed. Transducers that operate at 40 KHz or 20 KHz have been found to achieve successful seals. Nevertheless, it will be appreciated that it is possible to utilize transducers having other ultrasonic operating frequencies. The nose of horns 43, 63 may be smooth or include radial grooves, and, if smooth, may have a knurl on its end to facilitate seal of all portions of top edge 15 from the wings of tire tread strip 11, through its shoulder to its centerline 16. Moreover, it is preferable to orient transducers 40, 60 such that horns 43, 63 engage top edge 15 at an angle to a plane tangential to its surface at the point of contact, allowing improved coupling of the ultrasonic energy to tire tread strip 11 and smoother transverse motion.

Stack slides 50, 70, which carry stacks 44, 64, respectively and selectively engage horns 43, 63 with tire tread strip 11, include mounting plates 51, 71, engagement cylinders 52, 72, and stack holders 53, 73. Stacks 44, 64 are mounted upon stack holders 53, 73 by upper yokes 55, 75 and lower yokes 56, 76 secured by suitable means such as screws 57, 77 to stack holders 53, 73. Engagement cylinders 52, 72 are fixedly secured to mounting plates 51, 71, respectively and each include a pneumatic or other suitably powered piston 58, 78 secured to a flange in lower yokes 56, 76 such that as pistons 58, 78 extend from and retract into engagement cylinders 52, 72, stack holders 53, 73 are likewise moved and horns 43, 63 selectively engaged and disengaged with tire tread strip 11. Stack slides 50, 70 and stack holders 53, 73 are preferably mounted at an angle relative to the plane at the point of contact between horns 43, 63 and top edge 15 to facilitate the sealing operation of device 10 as explained hereinabove.

Transverse carriage 80 carries and drives stack slides 50, 70 in opposing directions across the width of tire tread strip 11. Transverse carriage 80 includes a screw 81 rotatably mounted in journals 82, 83 fixed to right angle bracket 23 and having an equal extent of right-handed threads 84 and opposite, left-handed threads 85, a reversible, variable-speed screw drive motor 90 mounted to right angle bracket 23, pulleys 91, 92 mounted to the end of the shaft of drive motor 90 and screw 81, respectively, and drive belt 93 for transferring the rotation of drive motor 90 to screw 81. Stack holder journals 95, 96 are fixed to the side of mounting plates 51, 71 opposite that to which engagement cylinders 52, 72 are mounted. Screw 81 right-handed threads 84 and left-handed threads 85 respectively pass through stack holder journals 95, 96, such that operation of drive motor 90 in a first rotational direction will cause stack slides 50, 70 and horns 43, 63 mounted thereon to be driven toward each other and the centerline 16 of tire tread strip 11, and operation of drive motor 90 in the opposite rotational direction will cause stack slides 50, 70 and horns 43, 63 to be driven away from each other and the centerline 16 of tire tread strip 11.

Figure 4:
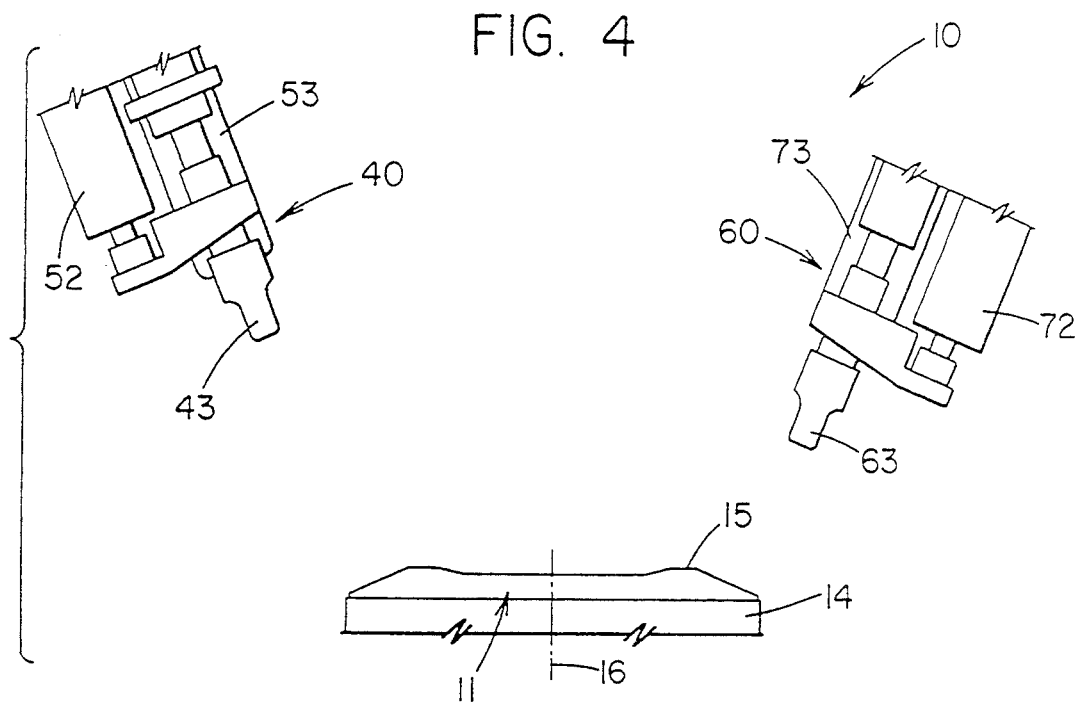
Figure 5:
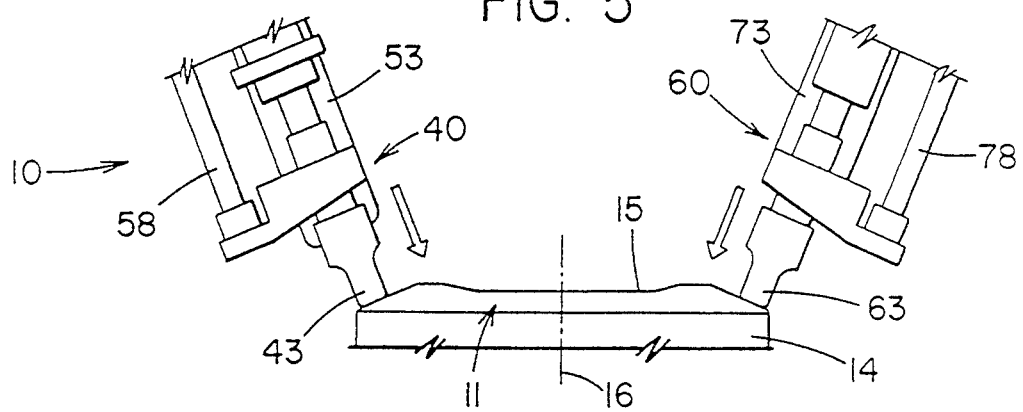

Operation of device 10 is straightforward and is best understood by reference to FIGS. 1, and 4 through 9 where tire tread strip 11 is shown in position upon tire building drum 14. Before operation of device 10 to effect seal of top edge 15 is begun, which for convenience will be described with respect to the relative position between horns 43, 63 and top edge 15, horns 43, 63 are in a position to avoid striking or otherwise interfering with other operations upon tire building drum 14 and other equipment. FIG. 4 depicts one such position, which may be called the "start" position, in which both horns 43, 63 are retracted as far as necessary above top edge 15 and are separated symmetrically about the centerline 16 of tire tread strip 11. Operation is begun by activating the transducers 40, 60 to generate ultrasonic energy of a preselected frequency (e.g., 40 KHz) and amplitude (e.g., any value producing a displacement at boosters 42, 62 of about 0.0004" (at 40 KHz) through 0.00052" (at 20 KHz)) and actuating engagement cylinders 52, 72 to drive horns 43, 63 into engagement with top edge 15 with a preselected pressure (e.g., about 33 lbs.) while horns 43, 63 are stationary at a preselected initial contact point as shown in FIGS. 5 and 1. While it is possible to make the initial contact point on the wings of tire tread strip 11, a successful seal may be obtained with an initial contact point higher on its shoulder.

Figure 6:
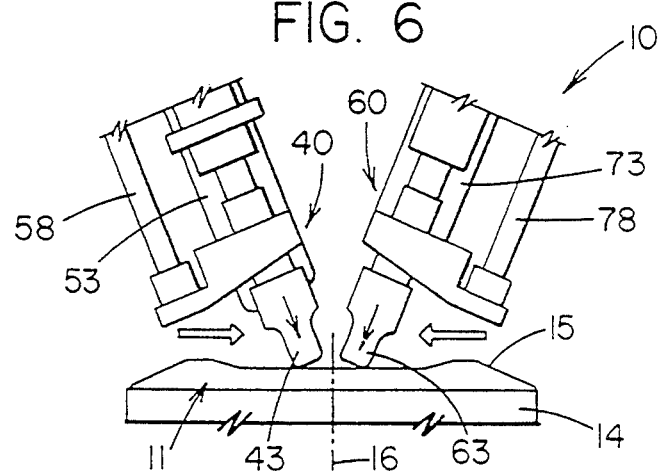

After a preselected period (e.g., about 3 seconds) during which horns 43, 63 remain stationary at the preselected initial contact point, engagement cylinders 52, 72 momentarily release all pressure to facilitate initiation of transverse motion of horns 43, 63 and screw drive motor 90 energized in a rotational direction to turn screw 81 such that horns 43, 63 begin to traverse toward the centerline 16 of tire tread strip 11, possibly at a speed of between about 0.41 inches per second (ips) and 1.08 ips, as shown in FIG. 6. As horns 43, 63 approach the crest of the edge or other desired location of tire tread strip 11, a preselected pressure of, for example, about 25 lbs. is reapplied by engagement cylinders 52, 72 and maintained or varied as desired as transverse motion continues at the same or variable speed.

When horns 43, 63 near the centerline 16 of tire tread strip 11, the engagement cylinder 52, 72 for one of the transducers 40, 60 retracts its horn to avoid contact with the other, as pictured in FIG. 7, and deenergizes its ultrasonic energy generation. However, in order to insure the complete seal of top edge 15 the second ultrasonic transducer assembly 60 continues its transverse motion across the centerline 16 for some preselected distance. In FIG. 8 the second ultrasonic transducer assembly 60 has moved across the centerline 16 to its preselected final position, while the first ultrasonic transducer assembly 40 has continued to move because of its operational connection to screw 81, avoiding contact with the second ultrasonic transducer assembly 60.

Finally, as shown in FIG. 9, the second ultrasonic transducer assembly retracts its horn 63 and deenergizes its ultrasonic energy generation, and at the desired time, transducers 40, 60 return to their respective start positions by energization of screw drive motor 90 with an opposite rotational direction.

In the example given through the operational description a conventional engagement cylinder having a 1.625 inch diameter bore cylinder generated pressures during traverse travel of horns 43, 63 up to about 27 psi and power supplies of from about 350 watts (at 40 KHz) to about 1000 watts (at 20 KHz) generated sufficient power for transducers 40, 60.

In addition to the aspects of the present invention noted above, other alternatives and features should now be apparent or may be better understood. For example, transducer design will fix frequency during operation with a given transducer, and quality seals may be obtainable without variation of transducer 40, 60 amplitude. Alternatively, it may not be necessary to vary speed or pressure, although its has been found that these two parameters are directly proportional, requiring more speed with more pressure and vice versa. Additionally, improved response at low pressures and release of horns 43, 63 from a stationary position, may be accomplished with application of a retracting counter-pressure to the rods within engagement cylinders 52, 72. Also, alignment and operation may take place about a reference other than centerline 16. If desired, specific components may be made of assemblies of other members. For example, screw 81 may include suitably coupled right-handed and left-handed threaded screws.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed and method performed according to the concept of the present invention, and reasonably equivalent thereto, will accomplish the objects of the present invention and otherwise substantially improve the art of splicing materials such as a strip of uncured tire tread stock 11 by ultrasonic joining.

We claim:

1. A method for splicing by forming a splice joint along a top edge of a single strip of uncured tire tread stock strip having two mating, beveled ends into a single, uncured, continuous strip, the strip having a top edge, a first shoulder portion having a wing, an opposed, second shoulder portion having a wing, and a centerline located midway between the shoulder portions, a first crest between the first wing and the centerline, and a second crest between the second wing and the centerline, comprising:

positioning at a starting position a first ultrasonic transducer assembly adjacent a first shoulder portion and a second ultrasonic transducer assembly adjacent a second shoulder portion of the tread stock strip mounted on a cylindrical tire building drum so that the mating, beveled ends are adjacent; then engaging a first horn of said first ultrasonic transducer assembly at a first contact point located in the wing area of the first shoulder of the strip by actuating a first engagement cylinder which applies a first preselected pressure to the tread strip at a first preselected contact point on the top edge at the first shoulder along the mating, beveled ends, and a second horn of said second ultrasonic transducer assembly at a second contact point located in the wing area of the second shoulder of the strip by actuating a second engagement cylinder which applies a second preselected pressure to the tread strip at a second preselected contact point on the top edge at the second shoulder along the mating, beveled ends;

activating said transducer assemblies to generate ultrasonic energy of a preselected frequency and amplitude to initiate the splice joint;

releasing preselected pressure at the contact points;

reapplying pressure to the tread strip; then traversing said horns toward the centerline of the tire tread strip along the mating beveled ends while said horns are activated at a preselected frequency and amplitude and in engagement with the tread to seal the mating, beveled ends at the top edge across the strip to form the splice joint; and retracting said horns from the tread near the tread centerline, deenergizing the ultrasonic energy and returning said horns to their starting position.

2. The method of claim 1 wherein the step of retracting further includes retracting and deenergizing said first horn near the tread centerline to avoid contact with said second horn while said second horn continues traversing past the tread centerline to a preselected final position, whereupon said second horn is retracted and deenergized.

3. A device for splicing a single strip of uncured tire tread stock strip having two mating, beveled ends into a single, uncured, continuous strip, the strip having a top edge, a first shoulder portion having a wing and a crest, a second shoulder portion having a wing and a crest, and a centerline located midway between the shoulder portions, the device forming a splice joint by sealing the top edge of the strip sufficiently to prevent separation of the splice joint, comprising:

a cylindrical tire building drum which holds the tire tread stock in position such that the mating, beveled ends are in contact;

a first ultrasonic transducer assembly and a second ultrasonic. transducer assembly for engaging the top edge of the tire tread strip at the mating beveled ends, each transducer assembly further comprised of a stack which includes a converter for receiving electrical power and generating an ultrasonic signal, a booster for receiving and amplifying the ultrasonic signal from the converter, and a horn for coupling the amplified signal to the tire tread strip to apply sufficient ultrasonic energy to seal the top edge of the treadstrip;

a stack slide assembly for carrying each stack comprised of a stack holder, an upper yoke attached to said stack holder for mounting said stack, a lower yoke attached to said stack holder for mounting said stack, at least one mounting plate, an engagement cylinder including a powered piston which extends and retracts from said cylinder, said engagement cylinder fixedly secured to said mounting plate and said piston attached to said lower yoke so that each of said stack holders move in relation to each of said pistons causing each of said horns to engage and disengage the tire tread strip, each of said horns first engaging the tire tread strip in the shoulder portion below the crest while each transducer is generating an ultrasonic signal to initiate the splice joint, then disengaging said horns from the tire tread strip prior to reengaging said horns to complete the splice joint;

a transverse carriage assembly extending across the width of the tire tread strip to move said stack holders across the tread strip width comprised of a double threaded screw having an equal number of right hand threads and opposite left hand threads, and a pair of journals mounted on opposite sides of said screws, said stack holder mounted to each journal; and a reversible drive motor connected to drive said screw such that rotation of said screw in a first direction causes said journals and attached stackholders to move toward each other across the tread strip width from the wings toward its centerline after initiation of the splice joint, and rotation in a second opposite direction causes said journals and attached stackholders to move away from each other across the tread strip width toward the tread strip wings.

4. The device, as set forth in claim 3, wherein, after said ultrasonic transducer assemblies are brought into reengagement with the tire tread strip at the mating beveled ends and stackholders move toward each other across the tread strip from the wings toward the centerline, said stack slide assembly attached to said first ultrasonic transducer assembly disengages said first ultrasonic transducer assembly from the mating, beveled ends prior to reaching the tread centerline while the tire tread stock is spliced by said second ultrasonic transducer assembly which still engages the mating, beveled ends past the tread centerline while said screw is rotated in said first direction.

5. The device of claim 3 wherein said transverse carriage assembly further includes a bracket to which said journals are fixedly attached, and to which said drive motor is mounted.

6. The device of claim 5 further including at least one pulley mounted to an end of a shaft of said drive motor and a drive belt connecting said pulley to said screw to transfer drive motor rotation to said screw.

7. The device of claim 3 further including a applicator roller for selectively engaging the tire tread strip on said tire building drum.

8. The device of claim 4 wherein said stack slide assemblies and said horns are mounted to engage the top edge of the tire tread stock strip along the mating beveled ends at an angle to a plane tangential to its surface at a point of contact with the strip.

9. The device of claim 8 wherein each of said engagement cylinders and powered pistons applies a variable pressure to said horns which in turn apply a variable pressure to the tire tread strip upon engagement.

10. The device of claim 9 wherein said engagement cylinders and powered pistons vary the pressure applied by said horns to the tread strip as said transducer assemblies traverse the tread strip.

11. The device of claim 10 wherein said first ultrasonic transducer assembly generates an ultrasonic signal having a preselected frequency and a variable amplitude as said first ultrasonic transducer assembly traverses the tread strip and said second transducer assembly generates an ultrasonic signal having a preselected frequency and a variable amplitude as said second ultrasonic transducer assembly traverses the tread strip.

* * * * *